UNITED STATES PATENT OFFICE 2,105,845

PRODUCTION OF ORGANIC SULPHUR COMPOUNDS

Walter Reppe and Fritz Nicolai, Ludwigshafen-on-the-Rhine, Germany, assignors to I. G. Farbenindustrie Aktiengesellschaft, Frankfort-on-the-Main, Germany No Drawing. Application November 22, 1935, Serial No. 51,084. In Germany December 4, 1934

11 Claims. (Cl. 260—43)

This invention relates to the production of organic sulphur compounds.

We have found that valuable and for the most part new organic sulphur compounds are obtained by causing alkylene-1.2-sulphides to act on primary or secondary monovalent or polyvalent amines i. e. primary or secondary amines containing one or more than one amino group respectively or secondary heterocyclic bases below about 300° C. The monoaminoethanethiols thus obtained as the primary reaction products may themselves add on again further amounts of alkylene sulphides so that polythioethane compounds of amines having any desired length of chain can be obtained.

Aliphatic, cycloaliphatic, aliphatic-aromatic, aromatic or heterocyclic amines or secondary heterocyclic bases may be employed in the reaction. Also those substitution products of the said compounds in which the substituents are firmly attached and which exert no oxidizing or polymerizing action on the alkylene sulphides are capable of adding on to the alkylene sulphides.

The addition of the alkylene sulphides to the said amines is carried out by heating the mixture of the initial materials, if desired in the presence of such solvents as are inert to the alkylene-1.2-sulphides employed, for example benzine or benzene hydrocarbons or ethers, until the sulphide has been absorbed. The reaction may also be carried out by heating to the temperature necessary for conversion the amine if desired dissolved or suspended in a suitable solvent and then introducing the vaporous or liquid alkylene sulphide at the rate at which it is absorbed. By reason of the fact that the tendency of the alkylene sulphides to polymerize is increased by substances having a strongly basic action it is advantageous in many cases to reduce the basic action of the amines by the addition of suitable substances, as for example phenols.

The temperatures most favorable for the reaction are generally speaking between 100° and 200° C. The separation of the mono- and dithiol compounds is usually effected by distillation at atmospheric or reduced pressure. Compounds having a great length of chain are usually no longer capable of distillation.

The yields are usually good. Especially good yields are obtained by employing the amines or their lower thiol compounds in excess. In this manner it is possible at the same time to avoid the formation of compounds having long chains in addition to the thiol compounds of low molecular weight.

The aminoethanethiol compounds obtainable according to this invention are capable of very varied industrial use. For example they are suitable for the preparation of dyestuffs vulcanization accelerators or auxiliary agents or assistants for the textile and related industries.

The following examples will further illustrate how this invention may be carried out in practice, but the invention is not restricted to these examples. The parts are by weight.

Example 1

A mixture of 930 parts of aniline and 300 parts of ethylene sulphide is heated in a pressure-tight vessel for four hours at from 100° to 105° C., then for six hours at from 130° to 140° C. and finally for ten hours at from 160° to 170° C. In the distillation of the liquid thus obtained under reduced pressure there are obtained in addition to 433 parts of aniline, 735 parts of anilidomonoethanethiol ($C_6H_5.NH.CH_2CH_2.SH$) which boils between 118° and 119° C. at 3 millimeters (mercury gauge). The yield calculated with reference to the aniline consumed is about 90 per cent of the theoretical yield.

In the same manner there are obtained from 1070 parts of ortho-toluidine and 300 parts of ethylene sulphide after heating for ten hours at 150° C., 700 parts of ortho-toluidine-monoethanethiol ($CH_3.C_6H_4.NH.CH_2.CH_2.SH$) which boils at 116° C. at 3 millimeters (mercury gauge). Similarly 2 - naphthylamino - mono - ethanethiol which boils at 184° C. at 3 millimeters (mercury gauge) may be obtained from 2-amino-naphthalene and ethylene sulphide, and normal-dodecylamino-ethanethiol which boils at from 141° to 143° C. at 2.5 millimeters (mercury gauge) may be obtained from normal-dodecylamine and ethylene sulphide.

Example 2

930 parts of aniline and 370 parts of 1.2-propylene sulphide (boiling point from 73° to 74° C.) are heated in a pressure-tight vessel for six hours at 150° C. By working up the resulting liquid there are obtained 664 parts of aniline and 478 parts of anilidomonopropanethiol

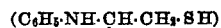

which boils at 95° C. at 1 millimeter (mercury gauge).

In the same manner benzylamino-monopropanethiol boiling at from 92° to 94° C. at 1 millimeter (mercury gauge) may be obtained from benzylamine and propylene sulphide and a mixture of normal butylaminomonopropanethol boiling at from 40° to 42° C. at from 0.8 to 1 millimeter (mercury gauge) and normal butylaminodipropanethiol boiling at from 85° to 86° C. at 0.5 millimeter (mercury gauge) is obtained in a good yield from normal butylamine and 1.2-propylene sulphide. From cyclohexylamine and propylene sulphide there is obtained a mixture of cyclohexylaminomonopropanethiol boiling at from 66° to 68° C. at 1 millimeter (mercury gauge) and cyclohexylamino-dipropanethiol boiling at 127° C. at 1 millimeter (mercury gauge) in the ratio of 1:2.

Example 3

30 parts of ethylene sulphide are mixed with 85 parts of piperidine in a pressure-tight vessel. Considerable spontaneous heating takes place. The mixture is then heated for from four to five hours at from 140° to 150° C. By working up the reaction mixture, 51 parts of piperidinomonoethanethiol boiling at from 50° to 51° C. at 1.5 millimeters (mercury gauge) and 9 parts of piperidinoethanethioethanethiol boiling at from 110° to 113° C. at 1.5 millimeters (mercury gauge) are obtained.

Example 4

74 parts of propylene sulphide are led in the form of vapour during the course of an hour through 186 parts of aniline which are kept at 180° C. in a stirring vessel. 56 parts of proylene sulphide are thus absorbed. By working up the reaction mixture there are obtained 110 parts of anilidomonopropanethiol and 10 parts of anilidopropanepolythiol which is no longer capable of distillation.

Example 5

By heating a mixture of 107 parts of monomethylaniline and 30 parts of ethylene sulphide for 8 hours at from 160° to 170° C. in the manner described in Example 2, there are obtained by working up the resulting liquid 63 parts of N-methylanilidomonoethanethiol which boils at 116° C. at 2.5 millimeters (mercury gauge).

N-methyldodecylamino-monoethanethiol having a boiling point at from 139° to 140° C. at 2.5 millimeters (mercury gauge) is obtained in the same way from N-methyldodecylamine and ethylene sulphide.

Example 6

470 parts of aniline and 300 parts of ethylene sulphide are heated in a pressure-tight vessel for eight hours at from 150° to 160° C. A further 300 parts of ethylene sulphide are then added and the whole again heated for eight hours at from 150° to 160° C. By working up the resulting liquid there are obtained 435 parts of anilidomonoethanethiol and 480 parts of anilidodiethanethiol

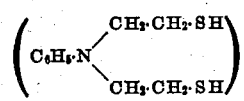

having a boiling point of 171° C. at 2.5 millimeters (mercury gauge).

For the preparation of anilido-diethanethiol, anilidomonoethanethiol may of course also be the initial material and this may be caused to react with ethylene sulphide, the anilidomonoethanethiol preferably being employed in excess.

Dibutylaminomonoethanethiol

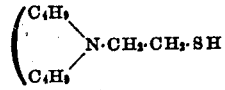

boiling at from 73° to 74° C. at 2 millimeters (mercury gauge)) and dibutylaminoethanethioethanethiol.

$$\left(\begin{array}{c}C_4H_9\\C_4H_9\end{array}\right)N\cdot CH_2\cdot CH_2\cdot S\cdot CH_2\cdot CH_2\cdot SH$$

boiling at from 129° to 130° C. at 2 millimeters (mercury gauge)) are obtained in the same manner from dibutylamine and ethylene sulphide.

What we claim is:—

1. The process of producing organic sulphur compounds which comprises treating an organic base containing at least one reactive hydrogen atom bound to the nitrogen atom with an alkylene 1.2-sulphide below about 300° C.

2. The process of producing organic sulphur compounds which comprises treating a monovalent amine containing at least one reactive hydrogen atom bound to the nitrogen atom with an alkylene 1.2-sulphide below about 300° C.

3. The process of producing organic sulphur compounds which comprises treating a secondary heterocyclic base containing at least one reactive hydrogen atom bound to the nitrogen atom with an alkylene 1.2-sulphide below about 300° C.

4. The process of producing organic sulphur compounds which comprises heating an organic base containing at least one reactive hydrogen atom bound to the nitrogen atom with an alkylene 1.2-sulphide below about 300° C. until the sulphide has been absorbed.

5. The process of producing organic sulphur compounds which comprises heating an organic base containing at least one reactive hydrogen atom bound to the nitrogen atom with an alkylene 1.2-sulphide below about 300° C. in the presence of an inert diluent until the sulphide has been absorbed.

6. The process of producing organic sulphur compounds which comprises adding to an organic base containing at least one reactive hydrogen atom bound to the nitrogen atom an alkylene 1.2-sulphide below about 300° C. at the rate at which it is absorbed.

7. The process of producing organic sulphur compounds which comprises treating an organic base containing at least one reactive hydrogen atom bound to the nitrogen atom with an alkylene 1.2-sulphide below about 300° C. in the presence of a phenol.

8. The process of producing organic sulphur compounds which comprises treating an organic base containing at least one reactive hydrogen atom bound to the nitrogen atom with an alkylene 1.2-sulphide at temperatures of between 100° and 200° C.

9. The process of producing organic sulphur compounds which comprises treating an organic base containing at least one reactive hydrogen atom bound to the nitrogen atom with the equimolecular weight of an alkylene 1.2-sulphide below about 300° C.

10. The process of producing organic sulphur compounds which comprises treating an organic base containing at least one reactive hydrogen atom bound to the nitrogen atom with an alkylene 1.2-sulphide in an amount of several times the molecular weight of the base employed below about 300° C.

11. The process of producing organic sulphur compounds which comprises treating an organic base containing at least one reactive hydrogen atom bound to the nitrogen atom with up to the equimolecular weight of an alkylene 1.2-sulphide below about 300° C.

WALTER REPPE.
FRITZ NICOLAI.